(12) United States Patent
Hayashi et al.

(10) Patent No.: US 10,810,295 B2
(45) Date of Patent: Oct. 20, 2020

(54) UNIFIED AUTHENTICATION MANAGEMENT SYSTEM

(71) Applicant: CARNEGIE MELLON UNIVERSITY, Pittsburgh, PA (US)

(72) Inventors: Eiji Hayashi, Pittsburgh, PA (US); Jason Hong, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 25 days.

(21) Appl. No.: 15/544,913

(22) PCT Filed: Feb. 19, 2016

(86) PCT No.: PCT/US2016/018578
§ 371 (c)(1),
(2) Date: Jul. 20, 2017

(87) PCT Pub. No.: WO2016/134203
PCT Pub. Date: Aug. 25, 2016

(65) Prior Publication Data
US 2018/0004928 A1  Jan. 4, 2018

Related U.S. Application Data

(60) Provisional application No. 62/176,485, filed on Feb. 19, 2015.

(51) Int. Cl.
*G06F 21/34* (2013.01)
*G06F 21/41* (2013.01)
(52) U.S. Cl.
CPC .............. *G06F 21/34* (2013.01); *G06F 21/41* (2013.01)

(58) Field of Classification Search
CPC ................................ G06F 21/34; G06F 21/41
See application file for complete search history.

(56) References Cited

U.S. PATENT DOCUMENTS

| 9,131,381 | B1* | 9/2015 | Sobel ...................... G06F 21/88 |
| 2006/0083228 | A1* | 4/2006 | Ong ........................ G06F 21/34 |
| | | | 370/389 |
| 2011/0047606 | A1 | 2/2011 | Blomquist et al. |
| 2012/0124613 | A1* | 5/2012 | Reddy .............. H04N 21/42202 |
| | | | 725/27 |
| 2012/0266220 | A1 | 10/2012 | Brudnicki et al. |
| 2013/0268767 | A1* | 10/2013 | Schrecker ............... G06F 21/31 |
| | | | 713/185 |
| 2014/0120894 | A1* | 5/2014 | Lee ........................ H04W 4/027 |
| | | | 455/418 |
| 2015/0096001 | A1 | 4/2015 | Morikuni et al. |

FOREIGN PATENT DOCUMENTS

| EP | 2355028 A1 | 8/2011 |
| EP | 2498529 A1 | 9/2012 |

OTHER PUBLICATIONS

International Search Report dated May 2, 2016 for International Patent Application No. PCT/US16/18578.

* cited by examiner

*Primary Examiner* — Ayoub Alata (57) ABSTRACT

A system for automatic authentication of a user to allow access to websites and physical devices which provides tiered levels of security and defines an API protocol for exchange of authentication credentials.

20 Claims, 8 Drawing Sheets

UNIFIED AUTHENTICATION MANAGEMENT SYSTEM

CROSS-REFERENCE TO RELATED APPLICATIONS

This application is a national phase claiming the benefit of and priority to International Patent Application No. PCT/US2016/018578, entitled "UNIFIED AUTHENTICATION MANAGEMENT SYSTEM," filed Feb. 19, 2016, which claims priority to Provisional U.S. Patent Application No. 62/176,485 filed Feb. 19, 2015, which are hereby incorporated by reference in their entireties.

RELATED APPLICATIONS

This application claims the benefit of U.S. Provisional Patent Application Ser. No. 62/176,485, filed Feb. 19, 2015.

BACKGROUND OF THE INVENTION

Reliable authentication is an essential requirement for secure systems. Passwords are the most common form of authentication today; however, a great deal of past research has shown that people have difficulties in memorizing and managing their passwords in a reliable and secure manner. For instance, people tend to choose simple passwords, re-use passwords among multiple accounts, and fall for phishing attacks.

When passwords were first introduced in the 1960s, computers were a scarce resource, and experts only had to manage a few passwords. However, the security landscape has changed dramatically: there are far more users, each managing numerous passwords, using systems with different security requirements, and facing new kinds of attacks. Given this context, there are people claiming that passwords are fundamentally broken. However, it is argued that passwords are still good enough if used appropriately. If passwords are, for instance, long, randomly generated, unique among multiple accounts, and updated periodically, we can address many of the problems described above. Better tools that can help people manage and use passwords securely and appropriately are needed.

The computing landscape is also changing as well. More and more physical objects are equipped with computation, storage, sensing, and network capabilities. These smart devices often need some sort of user identification/authentication; nevertheless, many physical objects do not have input capabilities suitable for password-based authentication (e.g. typing and pointing).

There are many password management applications. For example, all major web browsers have a built-in password management feature storing account information and automatically filling in this information later. There are also many standalone apps for computers and smartphones for managing credentials. While these apps help users store credentials, users often still have to do many steps manually to keep information in password managers consistent with that in online services.

There are also many research systems that manage passwords. For example, PassPet and PwdHash are browser extensions that dynamically generate site-specific passwords from a single master password and additional information such as user-chosen name for web sites or a domain name. While these systems do not store passwords, it is challenging to accommodate site-specific password composition policies. WebTicket embeds a credential in an encrypted QR code that can be printed or stored on smartphones. Some systems utilize mobile devices in the context of user authentication. Phoolproof Phishing is an authentication scheme designed to prevent phishing attacks, key loggers, and other kinds of malware. Gray is a physical access control system using smartphones. Nymi announced a wearable device that can manage authentication to physical devices, however, it requires other devices to support their own communication protocol. This makes its wide adoption challenging.

Other authentication systems depend on physical devices. RSA SecurID is a device for two-factor authentication. Users type their personal identification number as well as a number shown on the a hardware token to be authenticated. However, the tokens require server-side modifications. Furthermore, the deployment cost of the tokens is relatively high. As a result, the tokens tend to be used only for accounts with very high security requirements such as bank accounts. Single sign-on systems also try to address authentication problems. OAuth is one of the most commonly used single sign-on standards. With OAuth, a user can log into third party websites using an account at OAuth service providers such as Facebook and Google. However, involving multiple parties makes the system difficult to understand for users.

The FIDO alliance is a group of companies seeking to replace password-based authentication with public-private key pair based authentication. To log into an online account, a user first authenticates himself to his FIDO device with biometrics. Then, the device and a service complete authentication using a pre-shared public-private key pair. Although this approach could be more secure than password-based authentication, it requires server-side modifications and adoption of FIDO devices at the same time. Additionally, it has to meet a critical mass to be useful in practice.

There are many known password alternatives. It has been found that most schemes do better than passwords on security, however, every proposed scheme did worse than passwords on deployability, which is the biggest barrier for adoption.

SUMMARY OF THE INVENTION

The present invention was designed to address these challenges. There are two core components. The first is that a single primary device (the "authenticator") can be used to manage all of the procedures related to user authentication, including account creation, logging in, sharing accounts, etc. Recent changes in technology make this possible. In the United States, for example, smartphone penetration broke 65% in mid-2014, and it is very likely that in the future, everyone will have some kind of smart device that can be used as an authenticator. Second, smart devices can use onboard sensors to help strengthen authentication by using multiple factors to check that it is indeed the legitimate user who is trying to login, as well as improve the user experience by making authentication fast in safe situations, and making it more reliable in riskier ones.

The approach presented herein could help mitigate well documented problems with passwords. For example, people would no longer have to create passwords, memorize them, or type them in. In addition, it offers new kinds of protection through sensors and behavioral models, offers a transition path for stronger authentication, allowing the use of passwords in early stages of adoption, and be transparently replaced with stronger methods once a large fraction of users and services adopt. Lastly, the invention facilitates authentication for the "Internet of Things."

The present invention describes the design and evaluation of a unified authentication management system to streamline credential management in password-based authentication to devices and web services. This system stores all credentials (e.g. user names and passwords) on users' smart devices (including, but not limited to smartphones such as the iPhone) and provides credentials to laptops/desktops seamlessly. In one embodiment, an authenticator for iPhone and Mac was designed and implemented, allowing the evaluation of user interactions and experiences in ecologically valid conditions.

In the system presented herein, a user first authenticates himself to a client, typically a smartphone or other smart device. The client can then authenticate to other services and devices on the user's behalf. The present invention was implemented with an example iPhone prototype and embodies features not supported in existing password managers, such as tiered and location-aware lock control, authentication to laptops via a physical knocking, and seamless storage of credentials on smartphones.

DETAILED DESCRIPTION OF THE INVENTION

The goal of the present invention (referred to herein as the "unified authentication framework" or the "framework") is to remove users from the credential management processes by offering machine-readable interfaces for authentication. Using these interfaces, the framework authenticators can handle all tasks related to credential management, such as account creation, authentication, password updates, and account termination with minimum intervention by the user. Furthermore, the framework provides features not supported in existing password management systems, such as streamlined credential management and authentication to physical devices.

Users need only authenticate themselves to their authenticators (with the assistance of sensors) to access their accounts for both online services and physical devices. This invention describes the process of managing account information with one device.

The system consists of three components: a universal identity management protocol (UIMP), clients, and proxies. UIMP is a set of application programming interfaces (APIs) that enables the clients to communicate with services to complete tasks related to credential management. For online services, UIMP is implemented as a set of RESTful APIs. The observation here is that many aspects of authentication are only human-readable or require manual intervention. Examples include password composition policies, password reset mechanisms, account creations, and logins. UIMP creates a protocol that machines can understand and support. When websites and other devices implement UIMP, then any clients can interact with supported websites and devices with minimum human intervention. Because UIMP is intentionally designed in the same way as online services interact with users via html forms, a thin wrapper can be implemented on existing servers to make online services compatible with UIMP.

UIMP Clients (or "clients") are authenticators that manage users' credentials using UIMP. The client can be implemented on many different types of smart devices, e.g., smartphones or wearables, such as a smart watch. While the invention will be explained using a smartphone as the primary example, the invention is not meant to be limited to implementations using a smartphone.

The client communicates with services through UIMP on behalf of users. For instance, when a user wants to sign up for a service, the client can create an account by generating a strong and unique password that complies with any required password policies, providing requested user information (such as email addresses), and storing the credentials in a secure manner. When the user wants to authenticate to a service (or a physical device), the client automatically provides a credential. To address the bootstrapping problem, the client should also work with services that do not support UIMP (e.g. using heuristics to find the password field in a web page). Their functionalities are limited to ones that are feasible without UIMP. Nevertheless, users can get immediate benefit by using the client with services that do not support UIMP.

By having a smart device manage authentication, the burden of authentication from end-users to their devices can be shifted. However, there is a security risk in having one's smart device stolen. To address this, the client will protect the user's credentials using a set of onboard sensors. For example, for places with reasonable physical security (e.g., physical locks) like work and home, the client can operate focusing more on convenience, while for places that the user rarely or never goes to, or for situations that the system deems risky, the client can operate in a high security mode. Similarly, the New York Times web site may only need a low level of assurance, whereas the user's bank account may warrant a high level of certainty that the user is indeed the legitimate owner of the account.

UIMP Proxies (or "proxies") are applications typically running on the user's computer(s) that mediate the communication between browsers and the client (since web browsers cannot directly communicate with clients).

Although the system attempts to let one device (i.e., the device running the client) handle various tasks related to credential management, its underlying user authentication is based on user IDs and passwords. The invention describes this design choice for backward compatibility with existing services, as well as to allow partial adoption of in its early adoption stage. That is, users can use clients, without servers having to change anything. However, as servers adopt the system, clients can gain more functionality and security (e.g. using approaches stronger than passwords).

The present invention describes a client and a proxy that allows using them with existing online services. This is essentially equal to the early adoption stage, where clients and proxies are deployed without UIMP-compatible services.

Figure 1:
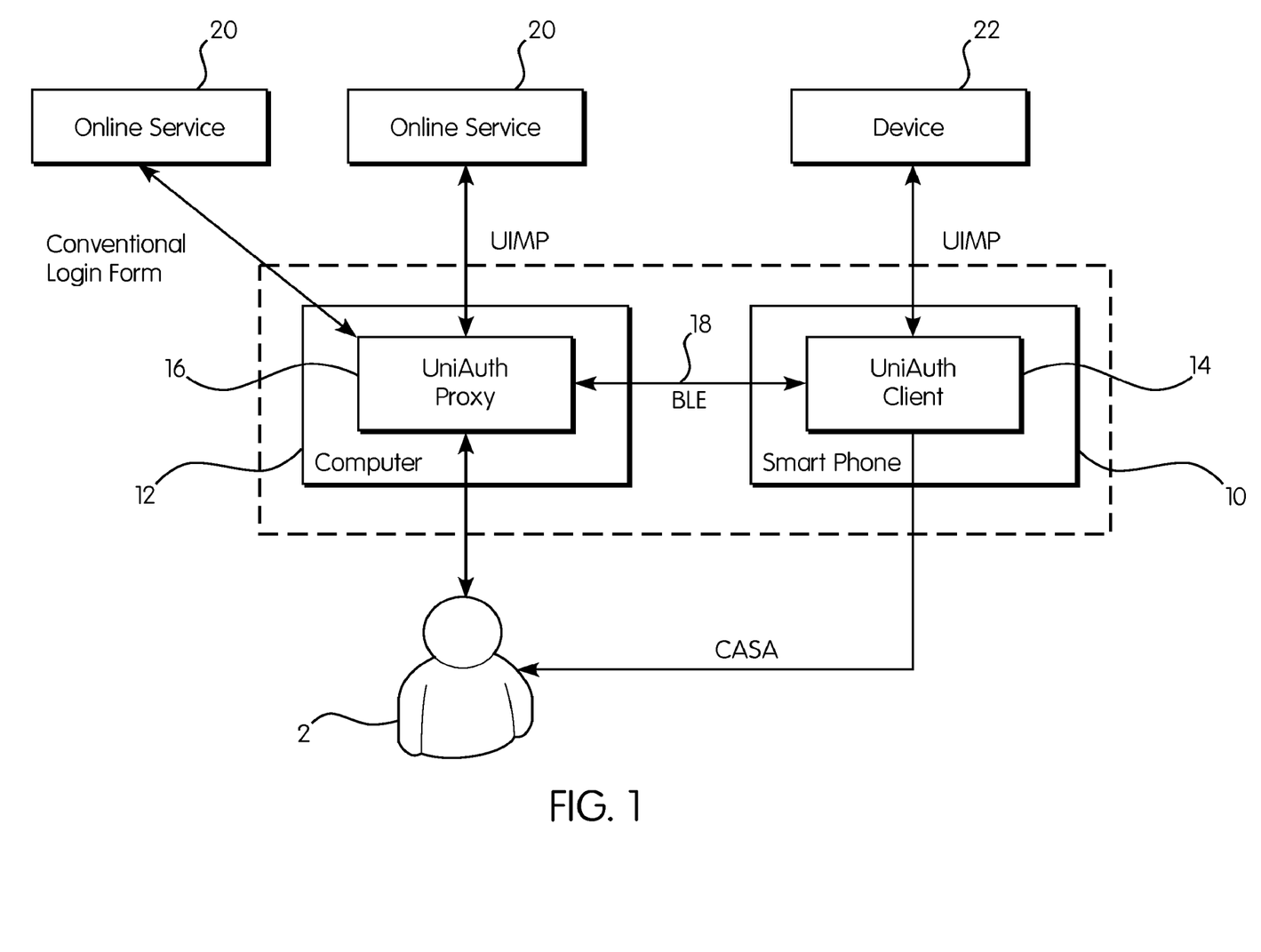
FIG. 1 is a top-level block diagram of one embodiment of the invention.
Figure 2:
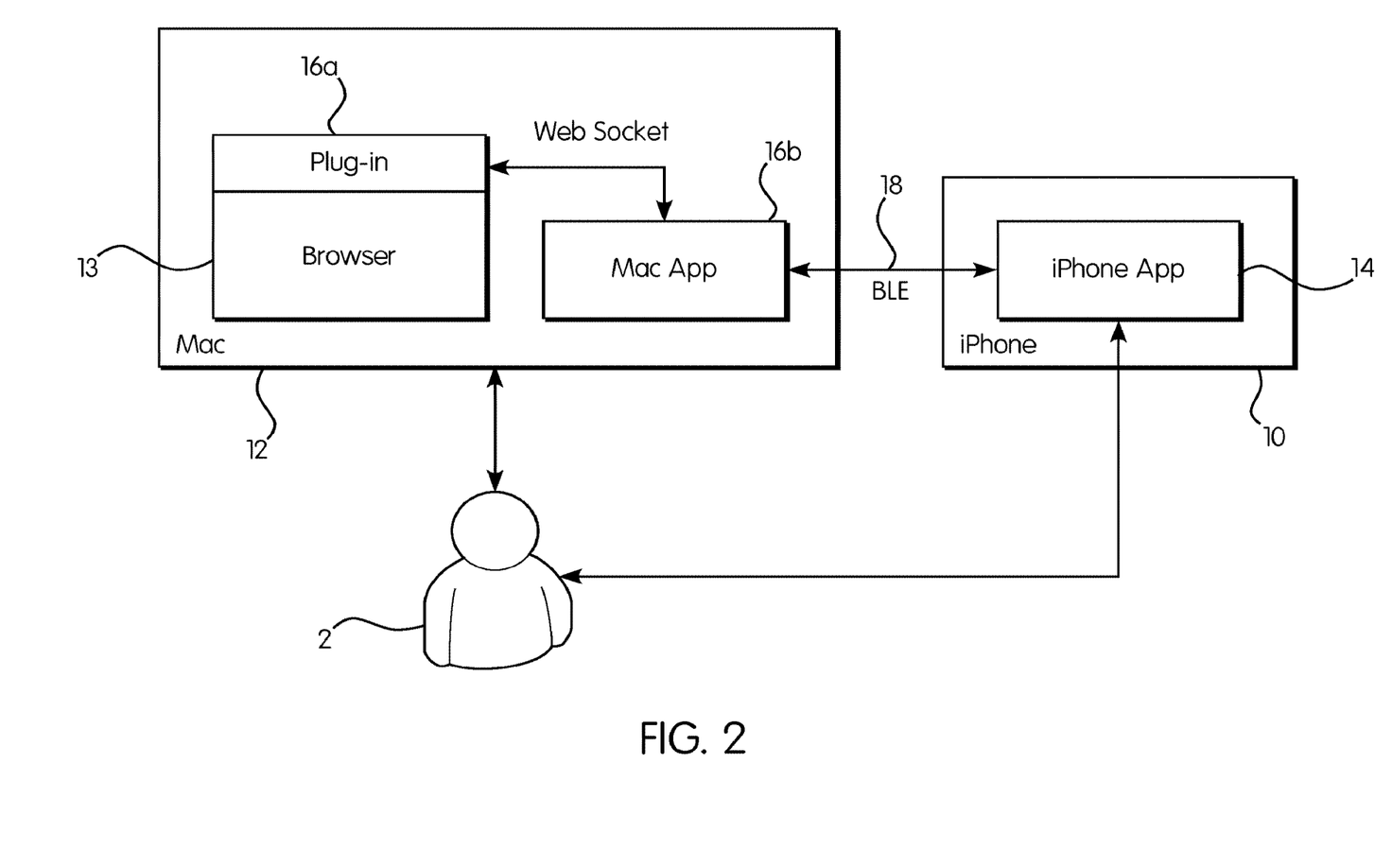
FIG. 2 is a block diagram showing the interaction between a user device and a computer.

An exemplary embodiment is shown in FIG. 1. A combined suite is comprised of client 14 running on an smartphone 10 and a proxy 16 on a computer 12. All account information is stored in a database in client 14. Proxy 16, as shown in FIG. 2, consists of extensions 16a for whichever browser 13 user 2 chooses to use and an application 16b that mediates communication between the browser extension 16a and the client 14, as well as provides an interface that allows users to manage account information stored in their smartphones 10 using computer 12.

Proxy 16 running on computer 12 connects with the client 14 running on smartphone 10 via a low energy link 18, preferably a Bluetooth Low Energy (BLE) link, and connects with the browser extensions 16a using a local web server 13. For security, user 2 can set the smartphone's BLE 18 to have a range of 1 to 15 meters. For both connections, mutual authentication is performed using a pre-shared key to prevent illegitimate connections. Once connection 18 is established, it is kept until smartphone 10 goes out of range or the application 16b running on computer 12 stops. All data exchanges after the mutual authentication are encrypted using AES-128. Because online services 20 do not, at the time of this writing, support UIMP, current implementations only support storing/auto filling credentials for online services 20 and computer 12.

Note that proxy 16 may also run on user device 10, for instance, when the user accesses a web site using a web browser running on user device 10 and desires automatic authentication.

Tiered and Location-Aware Access Control—In terms of access control, most existing password management systems have all-or-nothing access, i.e., allow access to all accounts or do not allow access to any accounts stored in the systems. However, it is difficult to satisfy different security and usability requirements for different accounts with this approach. To address this challenge, a tiered access control system was adopted.

Figure 3:
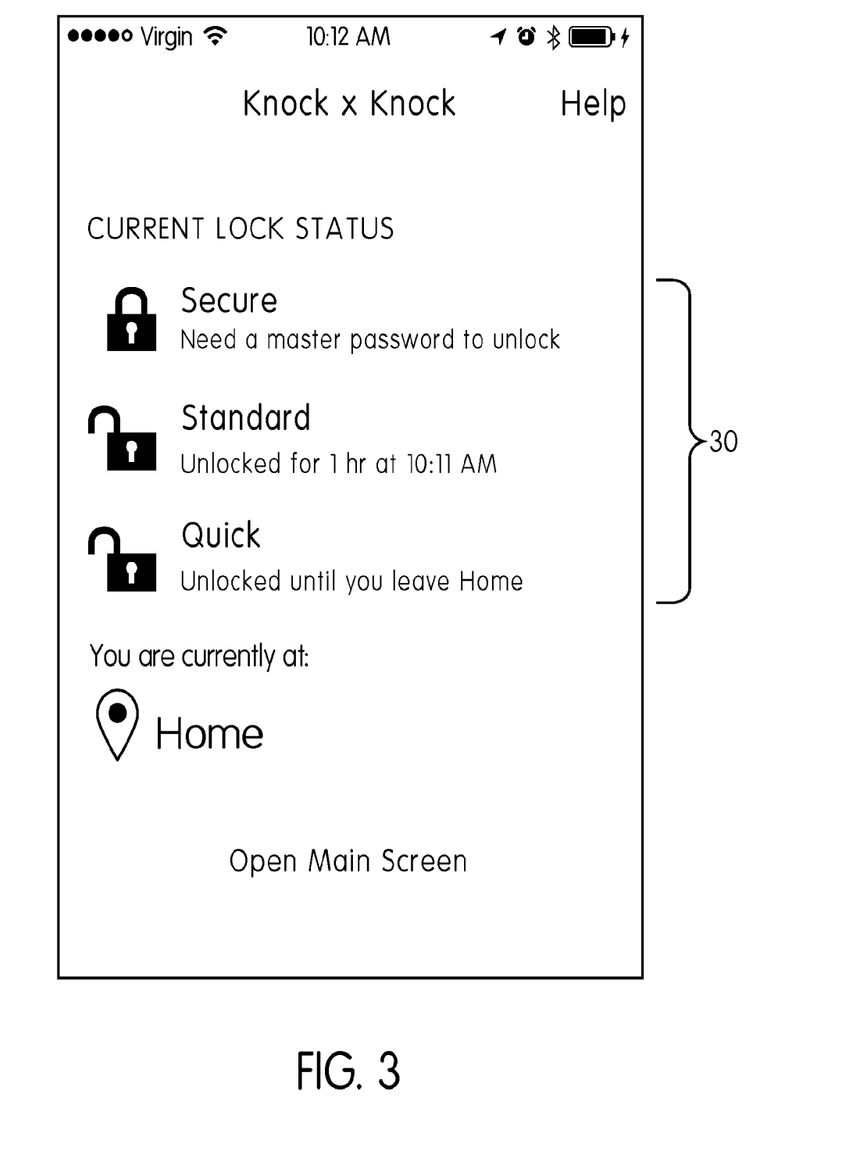
FIG. 3 is a smartphone screen shown the tiered access approach.

Each account, is stored in one of several tiers 30, shown in FIG. 3 as Secure, Standard, and Quick. Each tier has a lock state and can be locked or unlocked independently. Thus, unlocking the Secure tier does not unlock the Standard or Quick tiers. To access account information in a tier, the tier should be in an unlocked state. For instance, if user 2 saved their Amazon account access information in the Standard tier, the Standard tier must be unlocked first to let the invention fill his credential for Amazon on computer 12. One of skill in the art would realize that the number of tiers 30 is a design choice, or may be a user-settable parameter.

Figure 4:
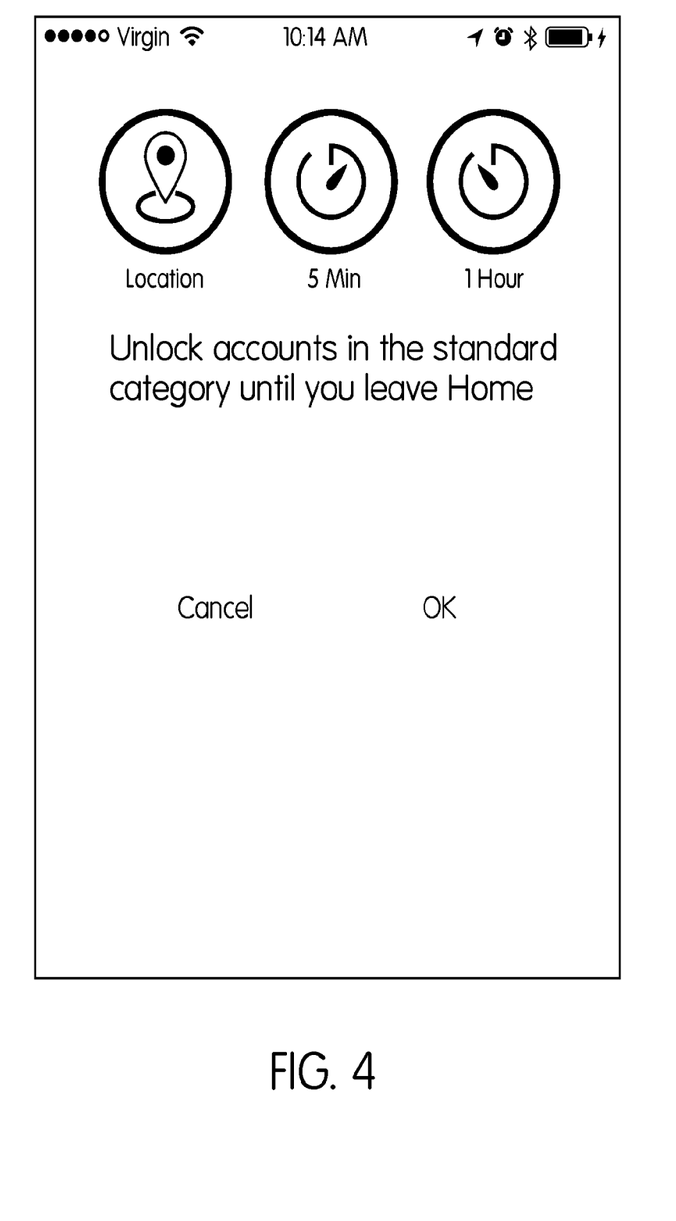
FIG. 4 shows a smartphone screen allowing the entry of a password to unlock a secured tier of accounts.

In the preferred embodiment, three tiers have been chosen. In the preferred embodiment, the Standard and Quick tiers are automatically locked and unlocked based on whether users are at trusted locations to make account accesses easier. Users can register trusted locations such as homes and workplaces using client 14 in smartphone 10. In the current embodiment, a location is a 100 meter radius from a registered geolocation. Entering a trusted location unlocks the Quick tier automatically. This lets user 2 log into accounts in the Quick tier on their computer 12 without touching their smartphone 10. Exiting a trusted location locks the Quick tier automatically. The Standard tier can be unlocked by typing a master password on smartphone 10, as shown in FIG. 4. Alternatively, a biometric, such as the touch ID on an iPhone, can be used. If this happens at a trusted location, the Standard tier is unlocked until an iPhone exits from the trusted location. The Secure tier can be unlocked for one-time access by typing a master password regardless of location. It gets locked after one of the accounts in that tier is accessed from computer 12. In addition to these options, a user can unlock any tier for a specified period (from five minutes to one day), also as shown in FIG. 3, by typing his master password or otherwise providing an identification via a biometric, regardless of location. Finally, a user can lock a tier manually at any time.

Figure 5:
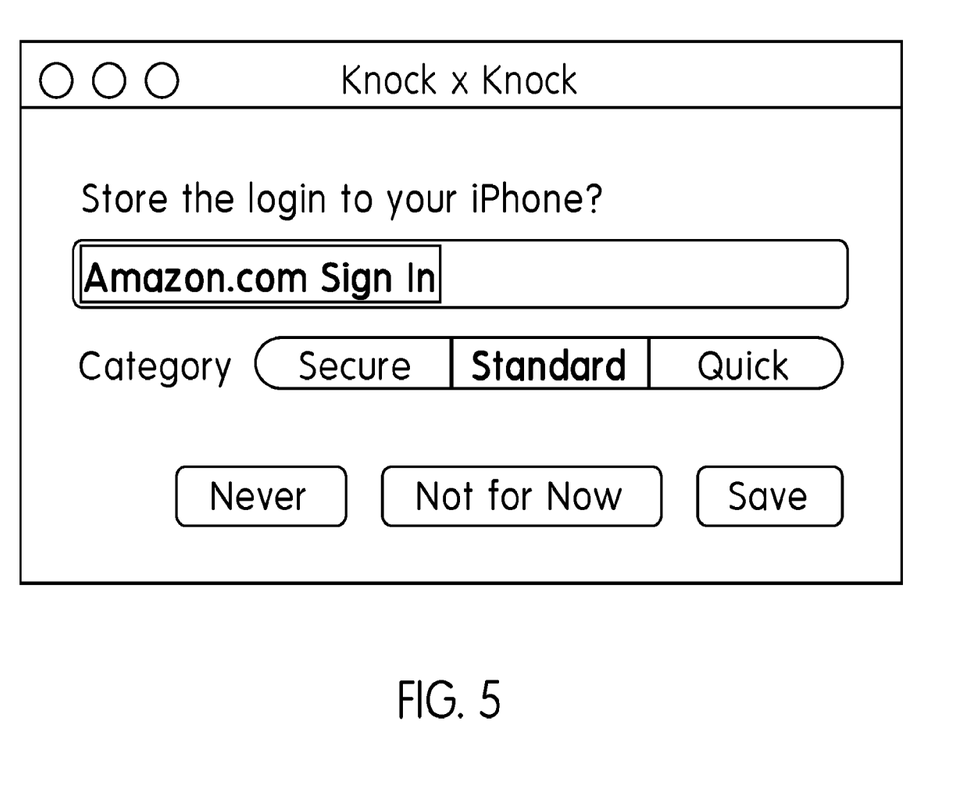
FIG. 5 shows a smartphone screen allowing the saving of access information for an online service.
Figure 6:
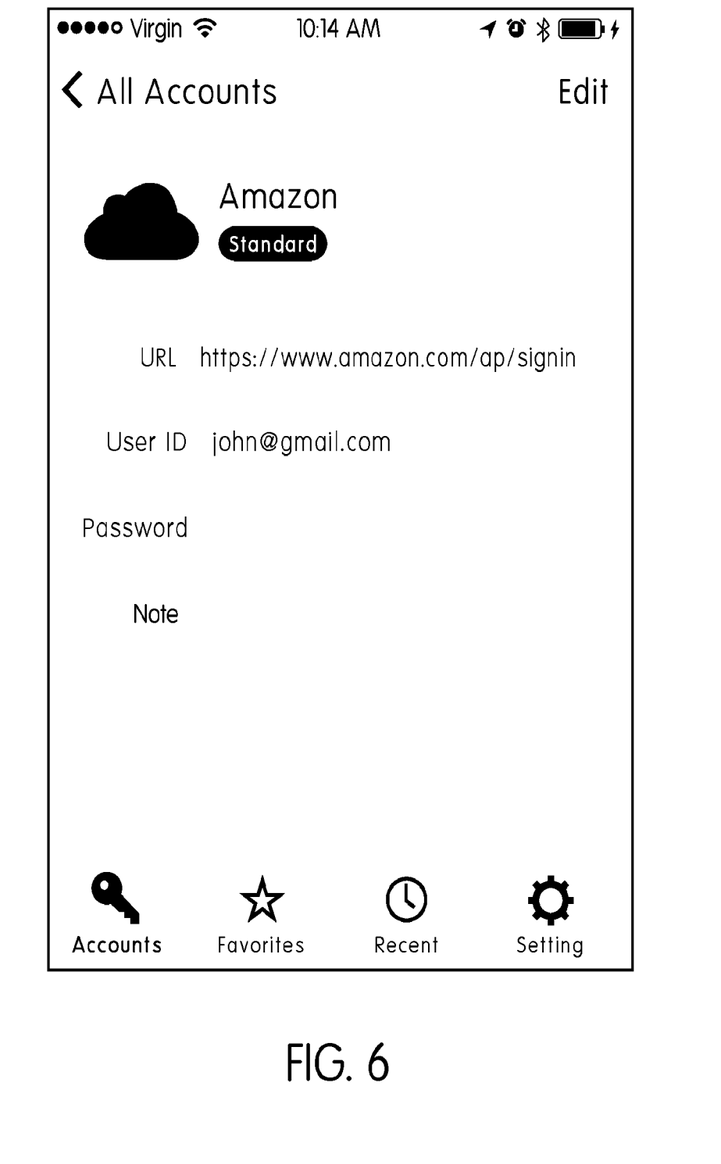
FIG. 6 shows a smartphone screen allowing viewing and editing of account access information.
Figure 7:
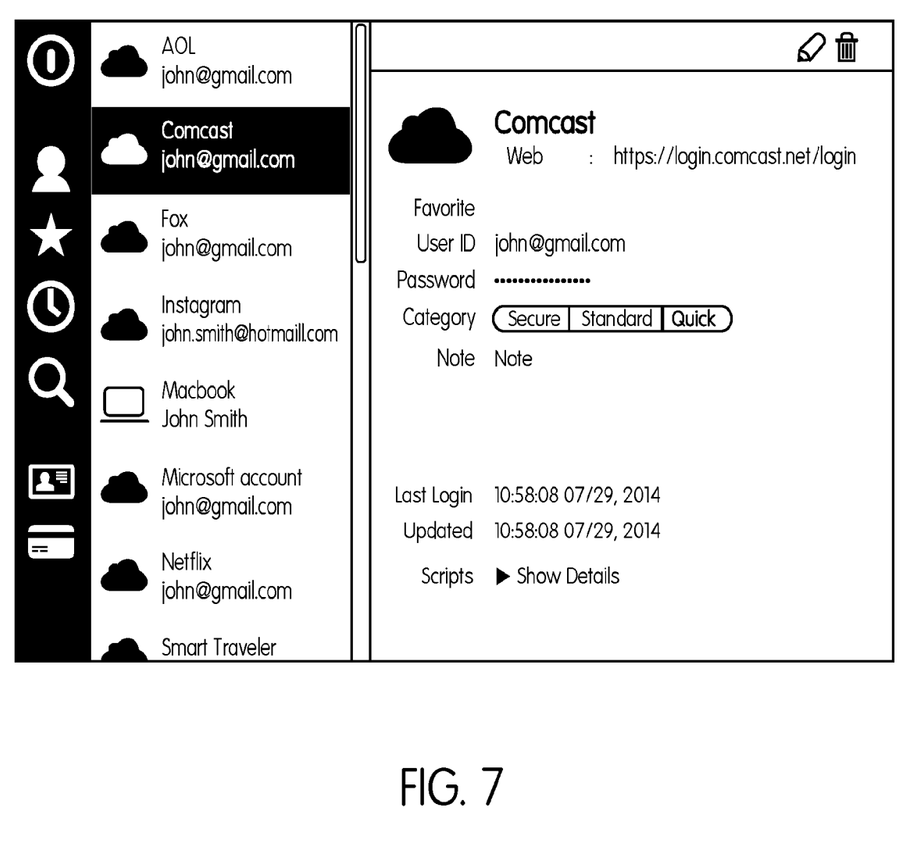
FIG. 7 shows a screen on the computer of the user allowing viewing and editing of account access information.

Storing and Managing Credentials—When user 2 logs into an account on a web site for the first time, the invention pops up a dialog asking if he wants to save his credentials, as shown in FIG. 5. User 2 can edit the name of the entry and its tier. When "OK" is clicked, the account information is sent to client 14. The account information consists of a user-configured name of the account, a URL, a user ID, a password, and IDs of a user ID field and a password field in a login form. After storing the information client 14 automatically fills the credentials when user 2 accesses the same website later. User 2 can also open a main screen by typing his master password to browse and edit stored account information, as shown in FIG. 7. This allows users to view their user IDs and passwords to log into accounts manually if needed (e.g., when logging into their accounts on foreign computers or when sharing an account with others). User 2 can also browse and edit account information using proxy 16 computer 12, as shown in FIG. 6. To access account information on computer 12, categories that the account information belongs to should be in an unlocked state.

Logging into Web Accounts and Devices—When user 2 opens a web page with a password field, browser extension 16a, sends the URL to client 14, which then looks up whether a corresponding account is stored for the domain. If an account is stored and its tier is unlocked, client 14 sends a credential to browser extension 16a, which then changes the colors of text fields in the login form to green, indicating that an account was found in the system. User 2 can double click on one of these fields to fill the credential. If the tier is locked, a dialog asking the user to unlock the tier appears when user 2 double clicks the text fields.

Users can also log into a device 22, as shown in FIG. 1, by physically knocking on the device 22 twice, as if knocking on a door. Alternatively, users can double click the command button. Note that device 22 may be the user's computer 12. This login will typically happen when a user wakes up computer 12 from sleep mode or from a password-protected screensaver. This feature is implemented to let participants experience logging into physical devices with authenticators. When proxy 16 detects either of these cases, it requests that the appropriate client 14 send a password for computer 12. If the credential for computer 12 is stored in client 14 and its tier is unlocked, client 14 sends a password back to proxy 16, and proxy 16 generates key type events to fill a password field and log into computer 12 automatically. Because a pre-shared key is required to establish a connection between smartphone 10 and computer 12, attackers cannot launch replay attack on this process without knowing the pre-shared key.

Figure 8:
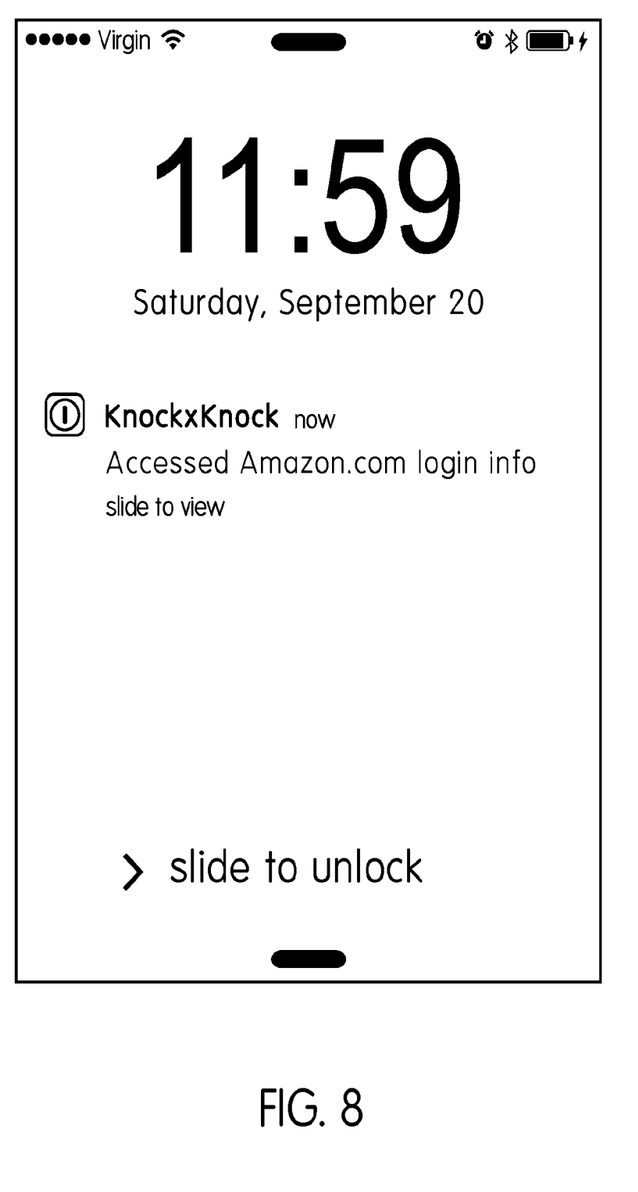
FIG. 8 shows a smartphone screen providing the user a status message that account information has been accessed.

When a credential is accessed from proxy 16, client 14 shows a notification message to user 2, as shown in FIG. 8. This notification helps lets a user know that someone accessed the account if user 2 is still in BLE range but not in front of the computer, for example, right after user 2 leave his computer 12.

The authentication to physical devices 22 can be expanded to any one of a number of devices commonly grouped together under the term "Internet of Things", for example, office doors, bike locks, copy machines, smart appliances, smart lighting systems, smart cars, etc., which have implemented the UIMP protocol. A user can indicate their desire to be authenticated by these devices through physically knocking them or by some other means, such as pressing buttons on them or via voice commands.

Furthermore, this authenticator can be implemented in wearable devices, such as, but not limited to, smart watches. This opens up new potential in user-system interactions. For instance, smart watches can have sensors that detect whether the watches are worn or not. A client 14 on the watch can request a master password when a user wears the watch and keep a tier unlocked until the user takes off the watch in addition to (or instead of) location-based access control implemented in the application and discussed herein. Furthermore, it is also possible to do mutual authentication between devices 22 and client 14 on watches using knocking gestures. Because the knocking pattern can be measured by both device 22 and the watch, we can verify whether user 2 wearing the watch is actually knocking the device by comparing the patterns.

Additional Features

Unified Account Creation—The system may include a unified account creation feature which provides a way for users to easily create their accounts. When a user visits a UIMP-enabled website for the first time, the system can ask if the user wants to create an account. If so, it displays a dialog with input fields for all information requested by the website such as a name and an email address. These fields are prepopulated with personal information stored in client 14, along with a randomly generated password. Also, if the user prefers, the password can be overwritten with a manually created, user-generated password. Then, when the user clicks the OK button, the system communicates with the website to create an account and store the account information in client 14. This is useful because in existing account creation procedures, a user has to take extra steps to save credentials in password managers after creating an account. However, with UIMP, password managers can create accounts and save credentials seamlessly.

Managing Password Updates—Users can receive a reminder after a specified time since their last password update. Users can select the period (e.g., 3 months), or it can be specified by a service if periodic password updates are enforced. When receiving a reminder, users can manually update a password in the invention via UIMP, or let the invention automatically update a password and notify afterward.

The invention has been presented using exemplary hardware and software implementations, but it should be realized by one of skill in the art that alternate implementations may be used without deviating from the intended scope of the invention, which is outlined in the claims below.

We claim:

1. A system for providing automatic user authentication, comprising:
an authenticator device having a processor and memory and executing authentication client software;
a user device having a processor and memory and executing authentication proxy software;
a database containing a plurality of authentication credentials for a user, accessible by the authentication client software; and
a security protocol defining conditions under which each authentication credential of the plurality of authentication credentials are authorized to be sent from the authentication client software to the authentication proxy software;
wherein the authentication proxy software:
establishes a first secure link with a browser extension of a browser running on the user device;
establishes a second secure link with the authentication client software on the authenticator device;
receives requests for authentication credentials from the browser extension for authenticating the user to a web site accessed by the user using the browser;
requests the authentication credentials from the authentication client software;
receives the authentication credentials from the authentication client software; and
provides the authentication credentials to the browser extension; and
wherein the authentication client software:
receives identification credentials from the user and verifies an identity of the user based on the identification credentials;
connects to the authentication proxy software via the second secured connection;
receives a request from the authentication proxy software for authentication credentials for the user to access the web site;
determines, via the security protocol, that the requested authentication credentials are authorized to be returned to the authentication proxy software when the authenticator device is within a predefined distance of a fixed geolocation;
receives geographic location information of the authenticator device;
determines, based on the geographic location information of the authenticator device, that the authenticator device is within the predefined distance;
retrieves the requested authentication credentials from the database; and
returns the requested authentication credentials to the authentication proxy software.

2. The system of claim 1 wherein the fixed geolocation is settable by a user of the authenticator device.

3. The system of claim 1 wherein the identification credentials comprise a password or a biometric.

4. The system of claim 1 wherein the security protocol disallows further returning of the authentication credentials after the authentication credentials have been returned at least once.

5. The system of claim 1 wherein the security protocol disallows returning of authentication credentials when the authenticator device travels a predetermined distance from the fixed geolocation.

6. The system of claim 1 further comprising a wireless link between the authenticator device and the user device.

7. The system of claim 6 wherein the security protocol allows returning of the requested authentication credentials while the wireless link between the authenticator device and the user device is maintained, and wherein the authentication client software further:
verifies that the wireless link between the authenticator device and the user device is present before returning the authentication credentials.

8. The system of claim 1 wherein the security protocol disallows returning of the authentication credentials a predetermined time after the authentication client software verifies the identity of the user.

9. The system of claim 8 wherein the pre-determined time is settable by the user.

10. The system of claim 6 wherein the authentication proxy software receives a request from the browser extension for the authentication credentials via a predefined protocol and makes the request for the authentication credentials to the authenticator device via the wireless link.

11. The system of claim 1 wherein the request from the authentication proxy software is initiated via an action of a user.

12. The system of claim 11 where the action is a knocking motion on the user device, the knocking motion being recognized by the authentication proxy software.

13. The system of claim 12 wherein the knocking motion is in a pre-defined pattern and wherein the predefined pattern serves as the identification credentials.

14. The system of claim 1 wherein the request for authentication credentials and the return of authentication credentials are performed via a defined API.

15. The system of claim 1 wherein the database stores the authentication credentials in an encrypted form.

16. The system of claim 1 wherein the authentication credentials are returned in an encrypted form.

17. The system of claim 1 wherein the authentication client software further:
  receives a request to update an existing authentication credential or to add a new authentication credential;
  generates a new password associated with the existing or new authentication credential; and
  stores the new password in the database.

18. A system for providing automatic user authentication, comprising:
  an authenticator device having a processor and memory and executing authentication client software;
  a user device having a processor and memory and executing authentication proxy software;
  a database containing a plurality of authentication credentials for a user, accessible by the authentication client software; and
  a security protocol defining conditions under which each authentication credential of the plurality of authentication credentials are authorized to be sent from the authentication client software to the authentication proxy software;
  wherein the authentication proxy software:
    establishes a secure link with the authentication client software on the authenticator device;
    receives requests for authentication credentials from the user device allowing the user to access the user device;
    requests the authentication credentials from the authentication client software;
    receives the authentication credentials from the authentication client software; and
    provides the authentication credentials to the user device; and
  wherein the authentication client software:
    receives identification credentials from the user and verifies an identity of the user based on the identification credentials;
    connects to the authentication proxy software via the secured connection;
    receives a request from the authentication proxy software for authentication credentials for the user to access the user device;
    determines, via the security protocol, that the requested authentication credentials are authorized to be returned to the authentication proxy software when the authenticator device is within a predefined distance of a fixed geolocation;
    receives geographic location information of the authenticator device;
    determines, based on the geographic location information of the authenticator device, that the authenticator device is within the predefined distance;
    retrieves the requested authentication credentials from the database; and
    returns the requested authentication credentials to the authentication proxy software.

19. The method of claim 18 wherein the request from the authentication proxy software is initiated via an action of a user and further wherein the action is a knocking motion on the user device recognized by the authentication proxy software.

20. The method of claim 19 wherein the knocking motion is in a pre-defined pattern and wherein the predefined pattern serves as the identification credentials.

* * * * *